(12) United States Patent
Ruebsam et al.

(10) Patent No.: US 9,518,618 B2
(45) Date of Patent: Dec. 13, 2016

(54) MANUAL SHIFT TRANSMISSION AND CLUTCH ASSEMBLY THEREFORE

(71) Applicant: GM GLOBAL TECHNOLOGY OPERATIONS LLC, Detroit, MI (US)

(72) Inventors: Christian Ruebsam, Bodenheim (DE); Mathias Remmler, Mauchenheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/577,606

(22) Filed: Dec. 19, 2014

(65) Prior Publication Data

US 2015/0176660 A1 Jun. 25, 2015

(30) Foreign Application Priority Data

Dec. 20, 2013 (DE) ........................ 10 2013 021 947

(51) Int. Cl.
| | | |
|---|---|---|
| F16D 13/40 | (2006.01) | |
| F16D 13/52 | (2006.01) | |
| F16D 21/06 | (2006.01) | |
| F16D 23/12 | (2006.01) | |
| F16D 13/42 | (2006.01) | |

(52) U.S. Cl.
CPC .............. *F16D 21/06* (2013.01); *F16D 13/40* (2013.01); *F16D 13/52* (2013.01); *F16D 13/42* (2013.01); F16D 2021/0646 (2013.01); F16D 2021/0676 (2013.01); F16D 2021/0684 (2013.01); F16D 2023/123 (2013.01)

(58) Field of Classification Search
CPC .............. F16D 2023/123; F16D 21/06; F16D 2021/0607–2021/0692; F16D 13/22; F16D 13/38–13/54

USPC ........................................................ 192/93 A
See application file for complete search history.

(56) References Cited

U.S. PATENT DOCUMENTS

| 646,331 | A | 3/1900 | Turc |
| 4,645,049 | A | 2/1987 | Matsuda et al. |

(Continued)

FOREIGN PATENT DOCUMENTS

| DE | 10033482 A1 | 10/2001 |
| DE | 102004004931 A1 | 8/2005 |

(Continued)

OTHER PUBLICATIONS

Machine translation of DE 102007014831 A1 downloaded from epo.org on Sep. 20, 2015.*

(Continued)

*Primary Examiner* — Richard Lorence
(74) *Attorney, Agent, or Firm* — Lorenz & Kopf LLP

(57) ABSTRACT

A clutch assembly for a manual shift transmission includes a first shaft, which carries a first clutch disc, a second shaft that is coaxial to the first shaft. The second shaft carries an axially shiftable second clutch disc, a first ramp, of which at least one section describes a helical line that is coaxial to the shafts, and a first actuating body. The first actuating body is clamped between the first ramp and the second clutch disc and can be moved about a common axis of the shafts between an open position, in which the clutch discs are spaced from one another, and a closing position, in which the clutch discs contact one another in a frictionally joined manner.

13 Claims, 2 Drawing Sheets

(56) References Cited

U.S. PATENT DOCUMENTS

| | | | | |
|---|---|---|---|---|
| 5,372,106 | A * | 12/1994 | Botterill | F02B 67/06 |
| | | | | 123/198 R |
| 6,578,693 | B2 * | 6/2003 | Mayr | F16D 13/52 |
| | | | | 192/226 |
| 7,104,379 | B2 * | 9/2006 | Puiu | F16D 29/005 |
| | | | | 192/70.23 |
| 2004/0231946 | A1 * | 11/2004 | Neelakantan | F16D 23/12 |
| | | | | 192/84.6 |
| 2007/0199792 | A1 | 8/2007 | Aschauer | |

FOREIGN PATENT DOCUMENTS

| | | | |
|---|---|---|---|
| DE | 102004023792 A1 | 12/2005 | |
| DE | 102007014831 A1 * | 7/2008 | F16D 13/04 |

OTHER PUBLICATIONS

DPMA, German Search Report dated Sep. 4, 2014 in DE 102013021947.7.

* cited by examiner

MANUAL SHIFT TRANSMISSION AND CLUTCH ASSEMBLY THEREFORE

CROSS REFERENCE TO RELATED APPLICATION

This application claims priority to German Patent Application No. 102013021947.7 filed Dec. 20, 2013, which is incorporated herein by reference in its entirety.

TECHNICAL FIELD

The technical field relates to a manual shift transmission and in particular a clutch assembly for such a manual shift transmission.

BACKGROUND

The clutches of conventional manual shift transmissions are typically designed for actuation by a clutch pedal and include two interacting clutch discs and a release bearing which annularly extends about a shaft of the clutch. The release bearing is axially moveable through pedal actuation, which axially adjusts one of the clutch discs via a release plate acting as a lever. Levers employed for actuating the release bearing require substantial installation space both in the direction of the axis as well as in radial direction. Apart from this, such a clutch is not well-suited for automatic actuation by means of an actuator, since rotary movement of the actuator initially has to be converted into a linear movement or alternately a step-down transmission between actuator and release bearing has to be provided in order to generate the force required for shifting the release bearing.

SUMMARY

In accordance with the present disclosure a clutch assembly is provided having a compact construction that is well suited for automated actuation. In particular, the present disclosure provides a clutch assembly with a first shaft carrying a first clutch disc, a second shaft carrying a second clutch disc that is coaxial to the first shaft and axially shiftable. A first ramp, of which at least one section describes a helical line is coaxial to the shafts and a first actuating body which, clamped between the first ramp and the second clutch disc, can be moved about a common axis of the shafts between an open position, in which the clutch discs are spaced from one another, and a closing position, in which the clutch discs touch one another in a frictionally joined manner. Accommodating the actuating body takes up minimal installation space and since an adjusting force can be exerted on the actuating body with a large lever arm, a simple and small actuator is sufficient for automated automation.

Between the actuating body and the second clutch disc a rolling bearing can be clamped in order to keep the force which upon rotation of the second shaft acts from the second clutch disc onto the actuating body in circumferential direction of the shaft. The smaller this force, the lower is the torque which an actuator has to be capable of generating in order to move the actuating body. In order to make possible a low-friction adjustment, the actuating body can in particular be formed as a ball.

According to a preferred configuration, the ramp apart from the helicoid section also includes a neutral section, on which the actuating body can be moved while the clutch discs are in the open position. Such a neutral section makes possible to utilize the same actuator for adjusting the clutch discs and for engaging a gear in a manual shift transmission in which the clutch assembly according to the present disclosure is used.

The neutral section can be surrounded on both sides by helicoid sections. Accordingly, each movement of the actuating body about the axis regardless of the direction, following the leaving of the neutral section and entry into one of the helicoid sections, ultimately leads to the reaching of the closing position. The advantages of this measure have an effect during the shifting of gears in a manual shift transmission using the clutch assembly.

According to a further development, the clutch assembly can be designed as a double clutch assembly, in which the first shaft carries a third clutch disc, a third shaft is designed as a hollow shaft concentrically surrounding the second shaft and carries an axially shiftable fourth clutch disc. A second actuating body, clamped between a second ramp and the fourth clutch disc, can be moved about a common axis of the shafts between an open position, in which the third and fourth clutch discs are spaced from one another, and a closing position, in which the third and fourth clutch discs touch one another in a frictionally joined manner. The first and second clutch disc can form a first clutch disc assembly and the third and fourth clutch disc a second disc assembly.

When the disc assemblies have different radii, they can be arranged overlapping one another in a space-saving manner. The first and second ramps can also be arranged on different radii with respect to the axis but in the process, for exerting the pressure that is necessary for establishing the frictional connection between the clutch discs have to be axially supported on a same carrier.

A lever, which acts on the actuating body arranged on the smaller radius, can extend through a gap that is kept clear between the carrier and the ramp arranged on the larger radius. In this way it can be prevented that the first and second actuating bodies mutually obstruct one another during their movements.

In order to evenly distribute the closing pressure on the second clutch disc over its circumference, at least three actuating bodies and first ramps should be distributed about the second shaft, namely preferentially on a circle that is coaxial to the axis and/or same angular intervals. Preferentially, the number of the actuating bodies and ramps in each case is exactly three.

The actuating bodies can be received in bores of a preferably disc-shaped holder that is rotatable about the second shaft. In particular when the actuating bodies are balls and are received in the bores with little play, they can, subject to an actuating force exerted on them by the disc in circumferential direction, rotate between ramp and rolling bearing, thereby making possible a low-friction adjustment.

In order to drive the adjustment, the holder can have a toothed segment. In particular when multiple actuating bodies and associated ramps are arranged on a same radius, the freedom of movement of an individual actuating body is practically only a fraction of a full circle in each case, and accordingly the toothed segment also has to extend at best over a fraction of a circle.

According to a further configuration of the present disclosure a manual shift transmission is provided with a clutch assembly as described above. The manual transmission also includes a gear shift sleeve, which can be moved between a neutral position, in which it allows the rotation of a loose wheel about a shaft, and a locking position, in which it locks the loose wheel on the shaft in a positively joined manner. A slotted link is provided having at least one section which describes a helical line with an axis that is parallel to the shaft, and a cam interacting with the slotted link, wherein of cams and slotted link the one, coupled to the rotation of the holder, is rotatable about the axis and the other drives the axial movement of the gear shift sleeve. Such a construction allows driving, with a single continuous actuating movement of an actuator, both the engaging and disengaging of a gear by shifting the gear shift sleeve, as well as adjusting the clutch disc between open and closing position.

When the helicoid section of the slotted link is surrounded on both sides by neutral sections extending about the shaft in circumferential direction it can be brought about that the adjustment of the clutch discs and the movement of the gear shift sleeve takes place in different phases of the actuating movement. In particular, the cam should interact for this with the helicoid section of the slotted link in particular when the actuating body is situated on the neutral section of the ramp. It can be thus ensured that the clutch discs are always in the open position while the gear shift sleeve is being moved so that no simultaneously transmitted torque can obstruct the adjustment of the gear shift sleeve.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
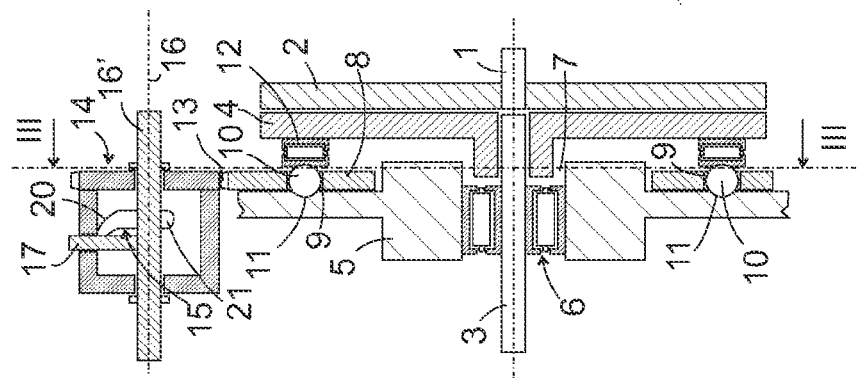
FIG. 1 is a schematic section through a clutch assembly according to the present disclosure along the plane designated I-I in FIGS. 2 and 3.

FIG. 1 shows a clutch assembly according to a first configuration of the present disclosure in a highly schematic form. On a first shaft 1 a first clutch disc 2 is attached in a rotationally fixed and axially immovable manner. A second shaft 3 is situated coaxially opposite to an end of the shaft 1. The second shaft 3 carries a second clutch disc 4 in a rotationally fixed but axially moveable manner. The shaft 3 extends through an opening of a plate-shaped carrier 5, which is connected in a fixed manner with a housing of a manual shift transmission (not shown) or forms a wall of this housing. In an aperture 7 of the carrier 5, the shaft 3 is held and guided through rolling bearings 6.

Coaxially to the shaft 1, a disc-shaped holder 8 with multiple axial bores 9, each of which receives an actuating body 10, extends round about the aperture 7. The actuating bodies 10 in this case are spherical; other shapes in use for the rolling bodies of rolling bearings, such as cylindrical or truncated cone shapes are likewise possible. The actuating bodies 10 each engage on a side in a ramp 11 recessed in the carrier 5. The depth of the ramp 11 is variable round about the shaft 1 in circumferential direction; in the section plane shown in FIG. 1, the actuating bodies 10 are each located at a point of maximum depth of the ramps 11. On a side which is located opposite the carrier 5 the actuating bodies 10 are in contact with an axial rolling bearing 12. A spring which is not shown exerts a force in axial direction on the clutch disc 4, through which the actuating bodies 10 and the rolling bearing 12 are held clamped between the clutch disc 4 and the carrier 5. On an edge region of the disc-shaped holder 8, a toothed segment 13 that is coaxial to the shaft 1 is formed.

When the clutch assembly is installed in a manual shift transmission, the toothed segment 13 meshes, as shown in FIG. 1, with a gear 14. An at least sectionally helicoid slotted link 15 is formed for converting rotary movement into translation. In the case shown here the gear 14 is rotatable about an axis 16, but held axially immovable on a shaft 16' extending along the axis 16, and a cam 17 projecting from the shaft 16' engages in the slotted link 15 in order to convert a rotation of the gear 14 into an axial translation of the rotationally fixed shaft 16'.

Figure 2:
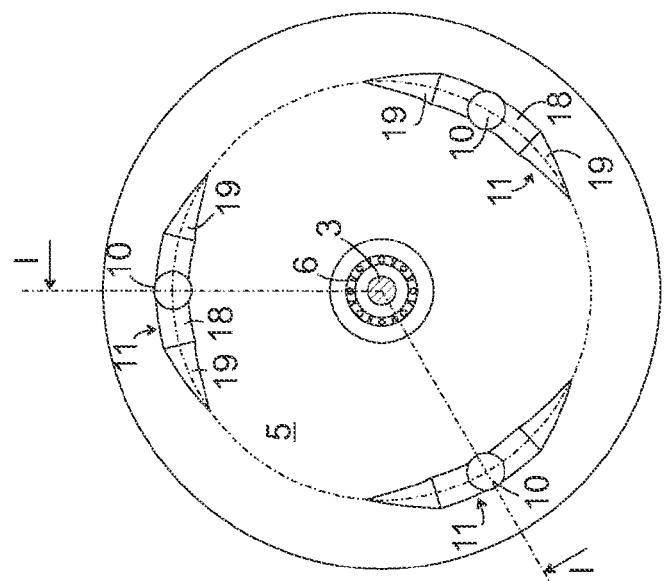
FIG. 2 is a top view of a carrier of the assembly from FIG. 1, with three ramps and balls guided on the ramps.

FIG. 2 shows a top view of the carrier 5 and the three actuating bodies 10 engaging in the ramps 11 of the carrier 5. The ramps 11 each have three sections following one another in circumferential direction, a central section 18 and pitch sections 19 adjoining the central section on both sides, in which the depth of the ramp 11 in each case decreases towards the outside.

Figure 3:
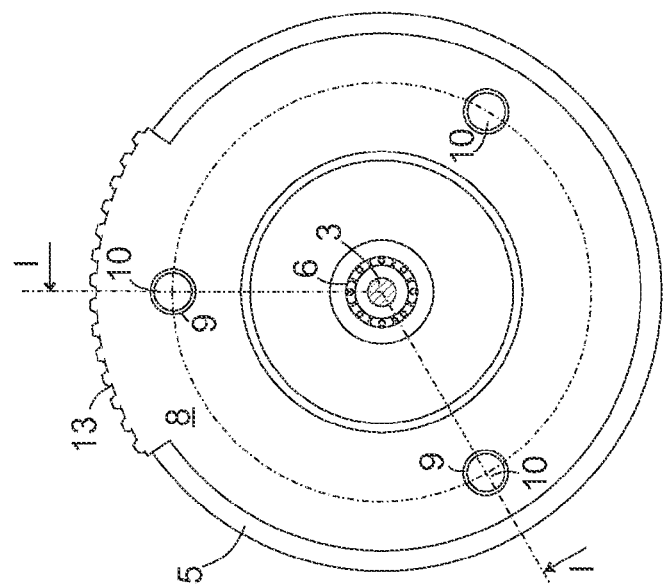
FIG. 3 is a section along the plane III-III from FIG. 1.

FIG. 3 shows a section through the clutch assembly along the plane described III-III in FIG. 1 and passing through the disc-shaped holder 8. In FIG. 2 and FIG. 3 the actuating bodies 10 are each situated in a neutral position, in the middle of the central section 18 of their ramps 11. When the holder 8 is driven to rotate about the shaft 3 via the gear 14, the actuating bodies 10 move in circumferential direction over the ramps 11. For as long as they are still situated in the central section 18, their spacing from the clutch disc 2 does not change in the process.

However, since the cam 17 engages in a helicoid section 20 of the slotted link 15, while the actuating bodies 10 are situated in the central section 18, a translation of the shaft 16' is achieved which can be utilized in order to for example actuate a gear shift sleeve of a locking synchronizer which is known per se and not shown in the figures on the shaft 3 or another shaft of the manual shift transmission, thereby engaging a gear in the manual shift transmission.

After the shaft 16' has shifted the gear shift sleeve far enough in order to engage the gear the cam 17 reaches a neutral section 21 of the slotted link 15 oriented in circumferential direction of the axis 16 so that, when the gear 14 is rotated further, the shaft 16' is no longer further displaced. As a consequence of this further rotation however the actuating bodies 10 enter pitch sections 19, in which they are guided along a helical line that is coaxial to the shafts 1, 3 and, in the process, corresponding to the pitch of the helical line, advance against the clutch disc 2. The pressure of the actuating bodies 10 is transmitted via the rolling bearing 12 to the clutch disc 4, pressing the latter against the clutch disc 2, so that the clutch closes and via the previously engaged gear, torque from the shaft 1 is transmitted to an output of the manual shift transmission.

Figure 4:
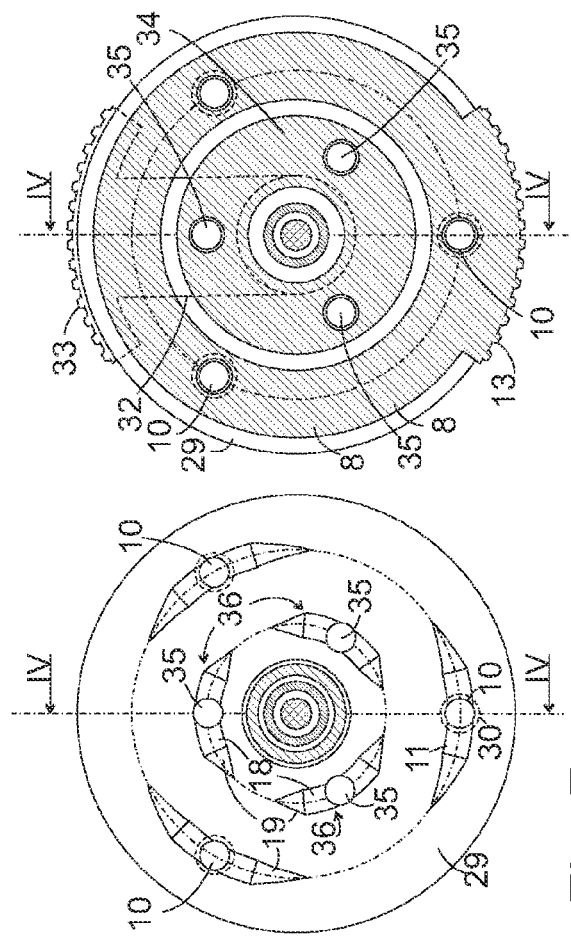
FIG. 4 is an axial section through a manual shift transmission with a clutch assembly according to a further developed configuration of the present disclosure.

FIG. 4 shows a further developed configuration of the clutch assembly and a manual shift transmission driven via the clutch assembly in an axial section. Again, a shaft on the drive side is designated 1, a shaft on the output side 3, clutch discs connected to the shaft 1, here in the form of a disc assembly 2 and clutch discs connected to the shaft 3, 4. A carrier, which connects the clutch discs 4 to the shaft 3 substantially has the shape of a flat bowl 23 with a wall section 24 oriented in axial direction, from which the clutch discs 4 radially project to the outside. Accordingly, a carrier of the clutch discs 2 is designed as a bowl 25 of a slightly larger diameter anchored on the shaft 1, in which the clutch discs 2 or discs project from an axial wall section 26 to the inside in order to engage between the discs 4. The wall section 26 is followed by a wall section 27 running radially inwardly, in which apertures 28 which are evenly distributed in circumferential direction are formed. Through the apertures 28 the clutch discs 4 are connected to the rolling bearing 12 and if appropriate exposed to the pressure exerted by the actuating bodies 10.

A ring 29, in which the ramps 11 guiding the actuating bodies 10 are recessed, is supported on the wall 5 of the transmission housing via multiple short columns 30 which are preferentially arranged directly behind the central section 18 of the ramps 11.

Figure 6:
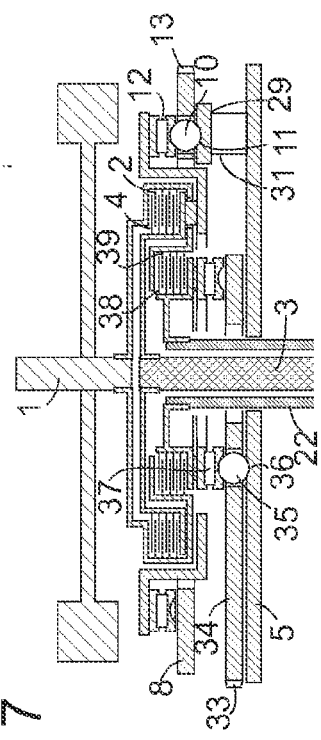
FIG. 6 is a section along the plane VI-VI from FIG. 4.
Figure 5:
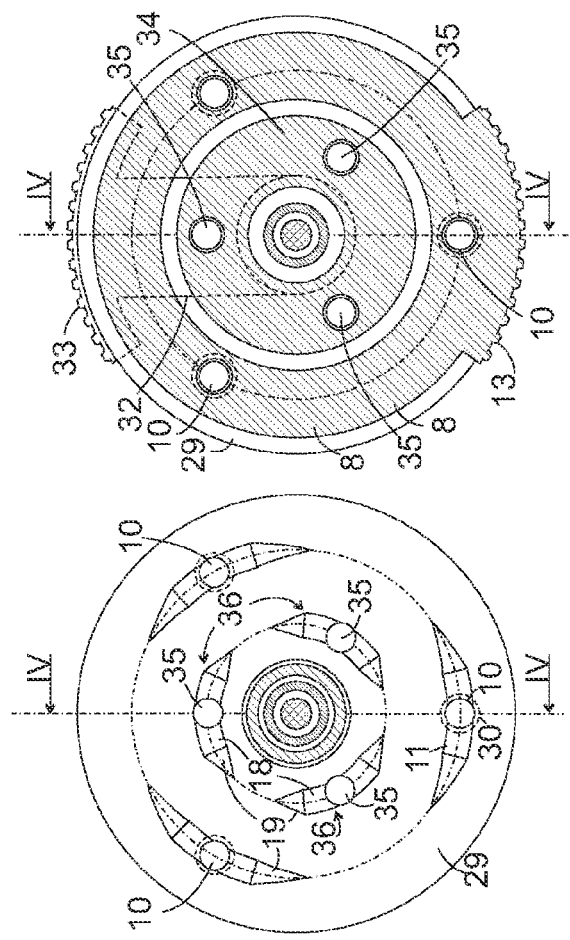
FIG. 5 is a top view of the carrier of the clutch assembly from FIG. 4 with six ramps arranged on two concentric circles.

Through a gap 31 kept clear between the ring 29 and the wall 5 an actuating lever 32 extends (see also FIG. 6). On a free end of the actuating lever 32 a toothed segment 33 is formed, which like the toothed segment 13 of the holder 8 is provided in order to be driven by a gear 14', which like the gear 14 described with respect to FIG. 1 is provided with a slotted link 15. The inner end of the actuating lever 32 is connected with a disc-shaped holder 34, which is accommodated in a central aperture of the holder 8 and like the same has three bores in which spherical actuating bodies 35 are captive. The arrangement of the holders 8, 34 radially nested into one another is evident in particular in the sectional representation of FIG. 6. As is evident in particular in FIG. 5, the actuating bodies 35 are moveable in ramps 36 which are recessed on a circle with smaller diameter than those of the ramps 11 in the ring 29. The sub-division of the ramps 36 into central section 18 of constant depth and pitch sections 19 is the same as in the ramps 11.

As is evident in turn in FIG. 4, the actuating bodies 35, via a second axial rolling bearing 37 surrounded by the rolling bearing 12 act on clutch discs 38, which are anchored axially moveably on an end facing the shaft 1 of a hollow shaft 22 concentrically surrounding the shaft 3. They interact with clutch discs 39, which are arranged on a second axial wall section 40 of the bowl 23, radially formed within the disc assemblies by the clutch discs 2, 4 and overlapping with these in axial direction.

The manual shift transmission shown in the left part of FIG. 4 is an arbitrary example of a double clutch transmission with which the clutch assembly described in the right part of the same figure and described above and can interact. Other designs of double clutch transmissions are equally possible.

The shaft 3 and the hollow shaft 22 each carry two fixed wheels 41, 42 and 43, 44 respectively. Auxiliary shafts 45, 46 are provided with loose wheels 47-53 and locking synchronizing devices 54-57.

A selection mechanism 58 which is not described in detail here optionally couples either the gear shift sleeve of the locking synchronizing device 56 or that of the locking synchronizing device 54 to the shaft 16 and via the latter to the holder 8. A second selection mechanism 59 optionally couples the gear shift sleeve of the locking synchronizing device 55 or 57 to the holder 34. In order to engage the first gear, synchronized in FIG. 4 as "1" in the circle, the locking synchronizing device 56 has to couple the loose wheel 50 to the auxiliary shaft 46. In the selection mechanism 58, the locking synchronizing device 56 is selected for this purpose and an actuator 60 acting on the gear 14' is activated in order to shift the shaft 16' and with it the gear shift sleeve of the locking synchronizing device 56 to the left, to the loose wheel 50. When the loose wheel 50 is coupled to the shaft 46 and the shifting of the shaft 16' terminated, the actuator 60 continues to rotate as a result of which the actuating bodies 10 enter the pitch sections 19 of their ramps 11 pressing the clutch discs 2, 4 against one another.

Even while the clutch discs 2, 4 are still in contact, an actuator 61 can be activated in order to bring the locking synchronizing device 57 in engagement on the loose wheel 53 and rotate the holder 34. For as long as the actuating bodies 35 in the process remain in the central sections of their ramps 36 no torque is transmitted via the wheels 44, 53. Only when the actuating bodies 35 enter the pitch sections of their ramps and the actuating bodies 10 simultaneously return into the central sections does a load change on the wheels 44, 53 and thus the shifting into the second gear, symbolized by "2" in the circle occur.

For the third gear, the wheel 47 is coupled to the shaft 45, for the fourth the wheel 48 to the shaft 45, for the fifth the wheel 51 to the shaft 46 and for the sixth gear the wheel 52 to the shaft 46.

Via a third auxiliary shaft which is not shown the wheel 49 drives a reverse gear. Alternatively, the wheel 49 can mesh with the loose wheel 53 on the auxiliary shaft 46, so that for engaging the reverse gear the wheel 49 is fixed to the auxiliary shaft 45 through the locking synchronizing device 55, while the locking synchronizing device 57 is out of engagement with the loose wheel 53. According to a further alternative, the fixed wheel 44 can be coupled to the wheel 49 via a wheel of an auxiliary shaft which is not shown.

Since even-numbered forward gears are each driven by one of the two shafts 3, 22 and odd-numbered ones by the respective other shaft, shifting without interruption between two successive gears is possible in each case.

Figure 7:
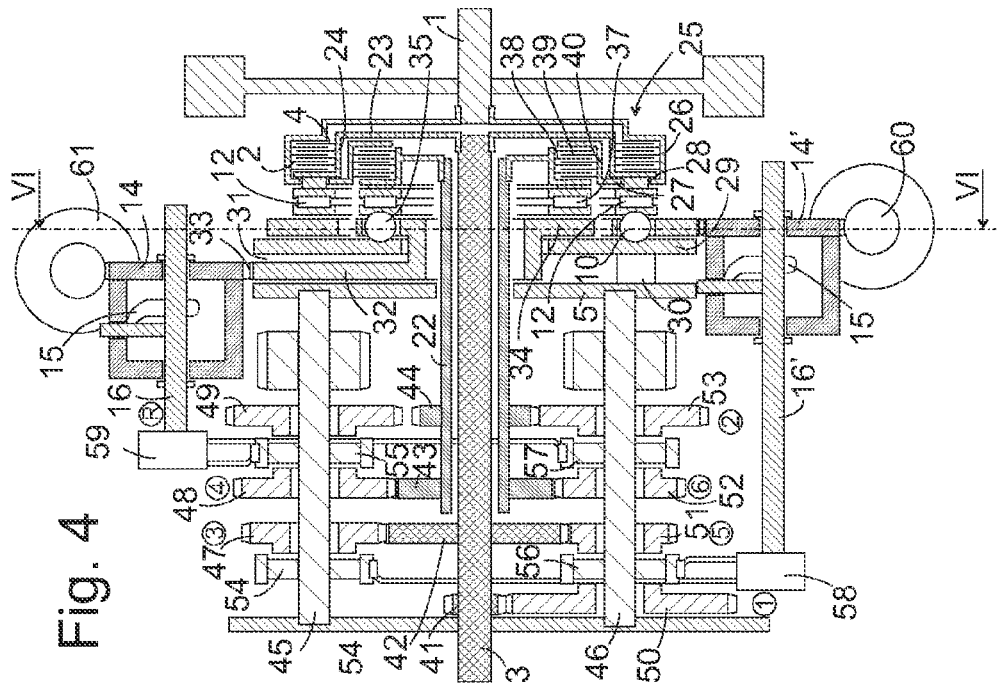
FIG. 7 is a section through a clutch assembly according to a version.

FIG. 7 shows a second clutch assembly for a double clutch transmission in an axial section analogous to FIG. 4. Components of the same function in this are marked here with the same reference numbers as in FIG. 4-6 and are not described again. Here, the outer axial rolling bearing 12 is arranged about the disc assembly formed by the clutch discs 2, 4 and axially offset against the inner rolling bearing 37. The ramps 11, 36 lie in different planes perpendicular to the shaft 2; in the case shown here the ramps 11 are situated on the ring 29, the ramps 36 by contrast on the wall 5 of the transmission housing. The structure of the holder 34 can be simplified because of this since these, other than shown in FIG. 4, can be unitarily plate-shaped like the holder 8, with a toothed segment 33 extending along its edge.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A clutch assembly for a manual shift transmission comprises:
   a first shaft carrying a first clutch disc;
   a second shaft that is coaxial to the first shaft and carries an axially shiftable second clutch disc, a first ramp, of which at least one section describes a helical line that is coaxial to the first and second shafts, and a first actuating body, which is clamped between the first ramp and the second clutch disc;
   wherein the first actuating body is movable about a common axis of the first and second shafts between an open position, in which the first and second clutch discs are spaced from one another, and a closing position, in which the first and second clutch discs contact one another in a frictionally joined manner,
   wherein the first actuating body is received in bores of a holder that is rotatable about the second shaft, and
   wherein a link formed with a helicoid slot section and rotatable with the holder and a cam is engaged within the slot section and coupled to a gear shift sleeve to translate the gear shift sleeve axially along the common axis between a neutral position and a locking position corresponding to the open position and the closing position, respectively.

2. The clutch assembly according to claim 1, further comprising a rolling bearing clamped between the actuating body and the second clutch disc.

3. The clutch assembly according to claim 1, wherein the actuating body comprises a ball.

4. The clutch assembly according to claim 1, wherein the ramp comprises a neutral section, on which the actuating body is moveable while the clutch discs are in the open position.

5. The clutch assembly according to claim 4, wherein the neutral section is surrounded on both sides by helicoid sections.

6. The clutch assembly according to claim 1, further comprising:
   a third clutch disc carried on the first shaft; and
   a third shaft formed a hollow shaft concentrically surrounding the second shaft and carrying an axially shiftable fourth clutch disc, and a second actuating body, clamped between a second ramp and the fourth clutch disc;
   wherein the second actuating body is movable about a common axis of the shafts between an open position, in which the third and fourth clutch disc are spaced from one another, and a closing position, in which the third and fourth clutch discs contact one another in a frictionally joined manner.

7. The clutch assembly according to claim 6, wherein the first and second clutch disc form a first disc assembly and the third and fourth clutch disc form a second disc assembly having different radii than the first disc assembly and arranged in an axially overlapping manner.

8. The clutch assembly according to claim 6, wherein first and second ramps are arranged on different radii with respect to the axis and are axially supported on a common carrier.

9. The clutch assembly according to claim 8, wherein a gap is maintained between the carrier and the ramp having a larger radius, and wherein a lever extends through the gap and engages the actuating body of the smaller radius.

10. The clutch assembly according to claim 1, wherein at least three first actuating bodies and at least three first ramps are distributed about the second shaft.

11. The clutch assembly according to claim 10, wherein the at least three first actuating bodies and at least three first ramps are distributed on a circle that is coaxial to the axis.

12. The clutch assembly according to claim 1, wherein the holder comprises a toothed segment.

13. The clutch assembly accordingly to claim 1, wherein the cam interacts with the helicoid slot section of the link when the first actuating body is situated on a neutral section of the first ramp to ensure that the clutch discs are in the open position while the gear shift sleeve is being moved.

* * * * *